(12) United States Patent
Chen et al.

(10) Patent No.: US 12,286,354 B1
(45) Date of Patent: Apr. 29, 2025

(54) METHOD FOR MANUFACTURING A HUMIDITY ALARM DEVICE BASED ON LASER-INDUCED GRAPHENE

(71) Applicant: Guangdong University of Technology, Guangzhou (CN)

(72) Inventors: Yun Chen, Guangzhou (CN); Bin Xie, Guangzhou (CN); Yuanhui Guo, Guangzhou (CN); Hao Zhang, Guangzhou (CN); Maoxiang Hou, Guangzhou (CN); Li Ma, Guangzhou (CN); Xin Chen, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/982,794

(22) Filed: Dec. 16, 2024

(30) Foreign Application Priority Data

Dec. 19, 2023 (CN) .......................... 202311761092.0

(51) Int. Cl.
    *C01B 32/194*      (2017.01)
    *B23K 26/362*      (2014.01)
    (Continued)

(52) U.S. Cl.
    CPC .......... *C01B 32/194* (2017.08); *B23K 26/362* (2013.01); *C01B 32/184* (2017.08); *G01N 27/121* (2013.01)

(58) Field of Classification Search
    CPC .... C01B 32/184; C01B 32/194; G01N 27/121
    See application file for complete search history.

(56) References Cited

U.S. PATENT DOCUMENTS 11,099,136 B2 * 8/2021 Agarwal ................. H10F 77/50
11,845,663 B2 * 12/2023 Liu ........................ C01B 32/184
(Continued)

FOREIGN PATENT DOCUMENTS

CN     103149246 A     6/2013
CN     105967170 A     9/2016
(Continued)

OTHER PUBLICATIONS

Lang, Changpeng, et al. "Ultra-compact, fast-responsive and highly-sensitive humidity sensor based on a polymer micro-rod on the end-face of fiber core." Sensors and Actuators B: Chemical 290 (Mar. 25, 2019): 23-27. (Year: 2019).*
(Continued)

*Primary Examiner* — Benjamin A Schiffman (57) ABSTRACT

A method for manufacturing a humidity alarm device based on laser-induced graphene is performed as follows. Carbon-based films are coated with a hydroxide ion-containing solution and processed by a laser device to generate hydrophilic graphene layers. The hydrophilic graphene layers are peeled off from the carbon-based films, wetted, and respectively wrapped around shaping rods varying in diameter. The wrapped rods are heated and shaped by a drying oven to obtain curled graphene switches. Each curled graphene switch is connected in series with an alarm lamp to form an alarm component. The alarm components are connected in parallel, and then connected to a positive terminal and a negative terminal of a power supply to form the humidity alarm device.

5 Claims, 8 Drawing Sheets

(51) Int. Cl.
*C01B 32/184* (2017.01)
*G01N 27/12* (2006.01)

(56) References Cited

U.S. PATENT DOCUMENTS

| 12,025,577 B2* | 7/2024 | Al-Moayid | G01N 27/125 |
| 2017/0151447 A1 | 6/2017 | Boesen | |
| 2021/0166981 A1* | 6/2021 | Chen | B23K 26/0853 |
| 2022/0175145 A1 | 6/2022 | Pomeroy et al. | |

FOREIGN PATENT DOCUMENTS

| CN | 110376253 A | | 10/2019 | | |
| CN | 110657898 A | * | 1/2020 | | G01K 7/183 |
| CN | 111896593 A | | 11/2020 | | |
| WO | WO-2019082022 A1 | * | 5/2019 | | C01B 32/184 |

OTHER PUBLICATIONS

Hou, Maoxiang, et al. "Laser-induced graphene coated hollow-core fiber for humidity sensing." Sensors and Actuators B: Chemical 359 (Feb. 4, 2022): 131530. (Year: 2022).*

Liu, Huilong, and Yun Chen. "Laser-induced graphene film and its applications in flexible electronics." Applied Sciences 12.21 (Nov. 5, 2022): 11233. (Year: 2022).*

Liu, Xing, et al. "Laser-scribed graphene for sensors: preparation, modification, applications, and future prospects." Light: Advanced Manufacturing 4.2 (Apr. 20, 2023): Article-number. (Year: 2023).*

Huang, Yexiong, et al. "Capacitive Humidity Sensor with Enhanced Sensitivity Based on Graphene Oxide/Lignosulfonate with Laser-Induced Graphene Electrodes for Non-Contact Detection." Lignosulfonate with Laser-Induced Graphene Electrodes for Non-Contact Detection. Dec. 13, 2024 (Year: 2024).*

Ma, Hongliang, et al. "Recent Advances in Graphene-Based Humidity Sensors with the Focus of Structural Design: A Review." IEEE Sensors Journal (May 17, 2024). (Year: 2024).*

Xie, Bin, et al. "Advances in graphene-based electrode for triboelectric nanogenerator." Nano-Micro Letters 17.1 (Sep. 27, 2024): 17. (Year: 2024).*

Cheng, Ao, et al. "Humidity Sensor Based on a Hollow Core Fiber Anti-Resonant Reflection Optical Waveguide." Photonic Sensors 15.2 (Jan. 21, 2025): 250202. (Year: 2025).*

* cited by examiner

METHOD FOR MANUFACTURING A HUMIDITY ALARM DEVICE BASED ON LASER-INDUCED GRAPHENE

CROSS-REFERENCE TO RELATED APPLICATIONS

This application claims the benefit of priority from Chinese Patent Application No. 202311761092.0, filed on Dec. 19, 2023. The content of the aforementioned application, including any intervening amendments made thereto, is incorporated herein by reference in its entirety.

TECHNICAL FIELD

This application relates to the laser-induced graphene, and more particularly to a humidity alarm device based on laser-induced graphene, and a manufacturing method thereof.

BACKGROUND

Humidity is an indicator for quantifying the water molecule content in the atmosphere, and is of great importance in many fields, particularly in the production and control processes. High humidity will have negative effects on the environment and living systems. In the daily production and life, and healthcare, humidity control is crucial for improving production efficiency and product quality, and maintaining the environment clean.

Currently, the humidity detection on the market mainly relies on humidity sensors. Traditional humidity sensors mainly rely on the absorption and desorption of moisture on absorbent materials. Although this method can provide a humidity value, it is limited by poor response, low sensitivity, and complex preparation. In recent years, graphene materials have gained widespread attention in the sensor field due to their excellent electrical, thermal, and mechanical properties, and hydrophilic graphene has been gradually adopted as a high-sensitivity and high-precision humidity-sensing material in the humidity detection. The humidity controllers based on hydrophilic graphene have advantages, such as fast response, high precision, low cost, and small size. Additionally, graphene materials also exhibit excellent stability and reproducibility, which makes them highly reliable and promising for the humidity detection.

Therefore, there is an urgent need to provide a humidity alarm device based on laser-induced graphene, and a preparation method thereof to address the shortcomings in the existing humidity detection.

SUMMARY

The purpose of the present application is to provide a humidity alarm device based on laser-induced graphene, and a manufacturing method thereof to solve the above problems.

The present application provides a humidity alarm device based on laser-induced graphene, comprising:
  a first curled graphene switch;
  a first alarm;
  a second curled graphene switch;
  a second alarm;
  a third curled graphene switch;
  a third alarm; and
  a power supply;

wherein the first curled graphene switch and the first alarm are connected in series via a first wire to form a first alarm component; the second curled graphene switch and the second alarm are connected in series via a second wire to form a second alarm component; the third curled graphene switch and the third alarm are connected in series via a third wire to form a third alarm component; the first alarm component, the second alarm component and the third alarm component are connected in parallel and then connected to the positive and negative terminals of the power supply via a fourth wire.

In an embodiment, the humidity alarm device further includes a protective shell with a porous structure; and the first curled graphene switch, the second curled graphene switch and the third curled graphene switch are provided in the protective shell.

In an embodiment, the protective shell is a porous plastic shell or a porous ceramic shell.

The present application further provides a method for manufacturing the humidity alarm device based on laser-induced graphene, comprising:
  (S1) coating surfaces of a first carbon-based film, a second carbon-based film and a third carbon-based film respectively with a hydroxide ion-containing solution;
  (S2) processing, by a laser device, the first carbon-based film, the second carbon-based film and the third carbon-based film to respectively generate a first hydrophilic graphene layer, a second hydrophilic graphene layer, and a third hydrophilic graphene layer;
  (S3) peeling off the first hydrophilic graphene layer, the second hydrophilic graphene layer, and the third hydrophilic graphene layer respectively from the first carbon-based film, the second carbon-based film and the third carbon-based film followed by wetting to obtain a first wetted hydrophilic graphene layer, a second wetted hydrophilic graphene layer and a third wetted hydrophilic graphene layer;
  (S4) wrapping the first wetted hydrophilic graphene layer around a first shaping rod, the second wetted hydrophilic graphene layer around a second shaping rod and the third wetted hydrophilic graphene layer around a third shaping rod, wherein the first shaping rod, the second shaping rod and the third shaping rod vary in diameter;
  (S5) transferring the first shaping rod wrapped with the first wetted hydrophilic graphene layer, the second shaping rod wrapped with the second wetted hydrophilic graphene layer and the third shaping rod wrapped with the third wetted hydrophilic graphene layer to a drying oven for heating and shaping to obtain a first curled graphene switch, a second curled graphene switch, and a third curled graphene switch, respectively; and
  (S6) connecting the first curled graphene switch in series with a first alarm lamp via a first wire to form a first alarm component; connecting the second curled graphene switch in series with a second alarm lamp via a second wire to form a second alarm component; connecting the third curled graphene switch in series with a third alarm lamp via a third wire to form a third alarm component; and connecting the first alarm component, the second alarm component and the third alarm component in parallel followed by connection to a positive terminal and a negative terminal of a power supply through a fourth wire to form the humidity alarm device.

In an embodiment, the first carbon-based film, the second carbon-based film and the third carbon-based film are each independently a polyimide film or a polyetherimide film.

In an embodiment, the hydroxide ion-containing solution is a sodium hydroxide solution or a potassium hydroxide solution.

In an embodiment, the first shaping rod, the second shaping rod and the third shaping rod are each a cylinder with a smooth surface; diameters of the first shaping rod, the second shaping rod and the third shaping rod are independently 1-50 mm; and the first shaping rod, the second shaping rod and the third shaping rod are each independently made of a plastic material or a metal material.

In an embodiment, the laser device is a picosecond ultraviolet laser with a laser wavelength of 340-360 nm and a laser power of 1-5 W.

In an embodiment, the step (S3) comprises:
laser-marking, by the laser device, the first hydrophilic graphene layer, the second hydrophilic graphene layer and third hydrophilic graphene layer in situ multiple times;
peeling off the first hydrophilic graphene layer from the first carbon-based film, the second hydrophilic graphene layer from the second carbon-based film and the third hydrophilic graphene layer from the third carbon-based film; and
wetting the first hydrophilic graphene layer, the second hydrophilic graphene layer and the third hydrophilic graphene layer by spraying to obtain the first wetted hydrophilic graphene layer, the second wetted hydrophilic graphene layer and the third wetted hydrophilic graphene layer, respectively.

Compared with the prior art, this application at least has the following beneficial effects.

The humidity alarm device provided herein includes a first curled graphene switch, a first alarm, a second curled graphene switch, a second alarm, a third curled graphene switch, a third alarm, and a power supply. The first curled graphene switch and the first alarm are connected in series via wires to form the first alarm component. The second curled graphene switch and the second alarm are connected in series via wires to form the second alarm component. The third curled graphene switch and the third alarm are connected in series via wires to form the third alarm component. The first alarm component, the second alarm component and the third alarm component are connected in parallel and then connected to the positive and negative terminals of the power supply via wires.

Through the parallel connection of the first alarm component, the second alarm component and the third alarm component, distinct alarm signals can be set to distinguish between various humidity alarm levels, so as to achieve the graded alarming. This configuration offers wide application and strong adaptability. Moreover, due to the use of hydrophilic graphene switches, the humidity alarm device exhibits fast response, high precision, low cost, small size, good stability, and excellent reproducibility. Additionally, the preparation method for this device is simple and easy to operate.

BRIEF DESCRIPTION OF THE DRAWINGS

The present disclosure will be described in detail below in conjunction with the accompanying drawings. Through the detailed description in conjunction with the following drawings, the above or other aspects of the present disclosure will become clearer and easier to understand.

DETAILED DESCRIPTION OF EMBODIMENTS

The embodiments/examples described herein are illustrative and exemplary, and should not be construed as limiting the scope of the disclosure. Based on the embodiments described herein, those skilled in the art can also arrive at other technical solutions. Any obvious substitutions and modifications made to these technical solutions shall fall within the scope of the present disclosure defined by the appended claims.

Figure 1:
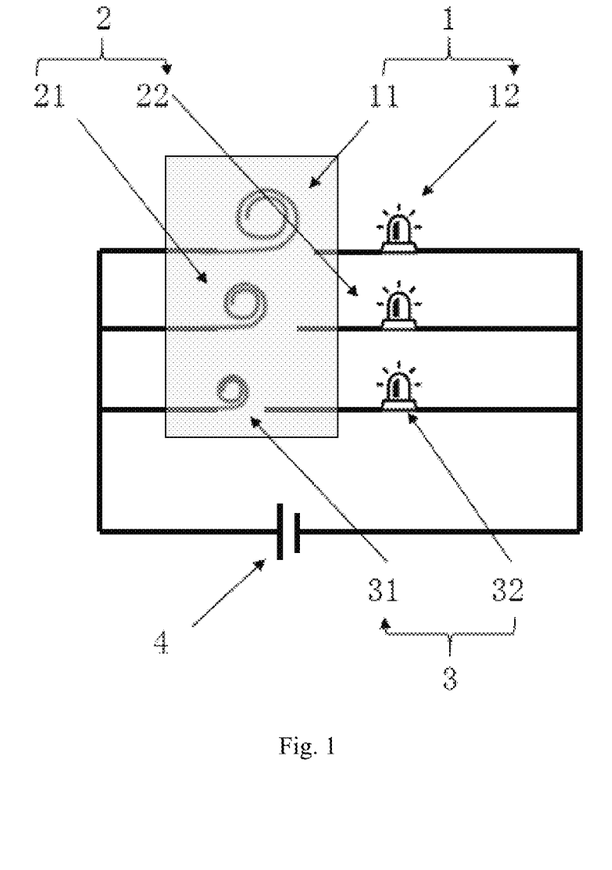
FIG. 1 is a schematic diagram of a humidity alarm device based on laser-induced graphene according to an embodiment of the present disclosure.
Figure 2:
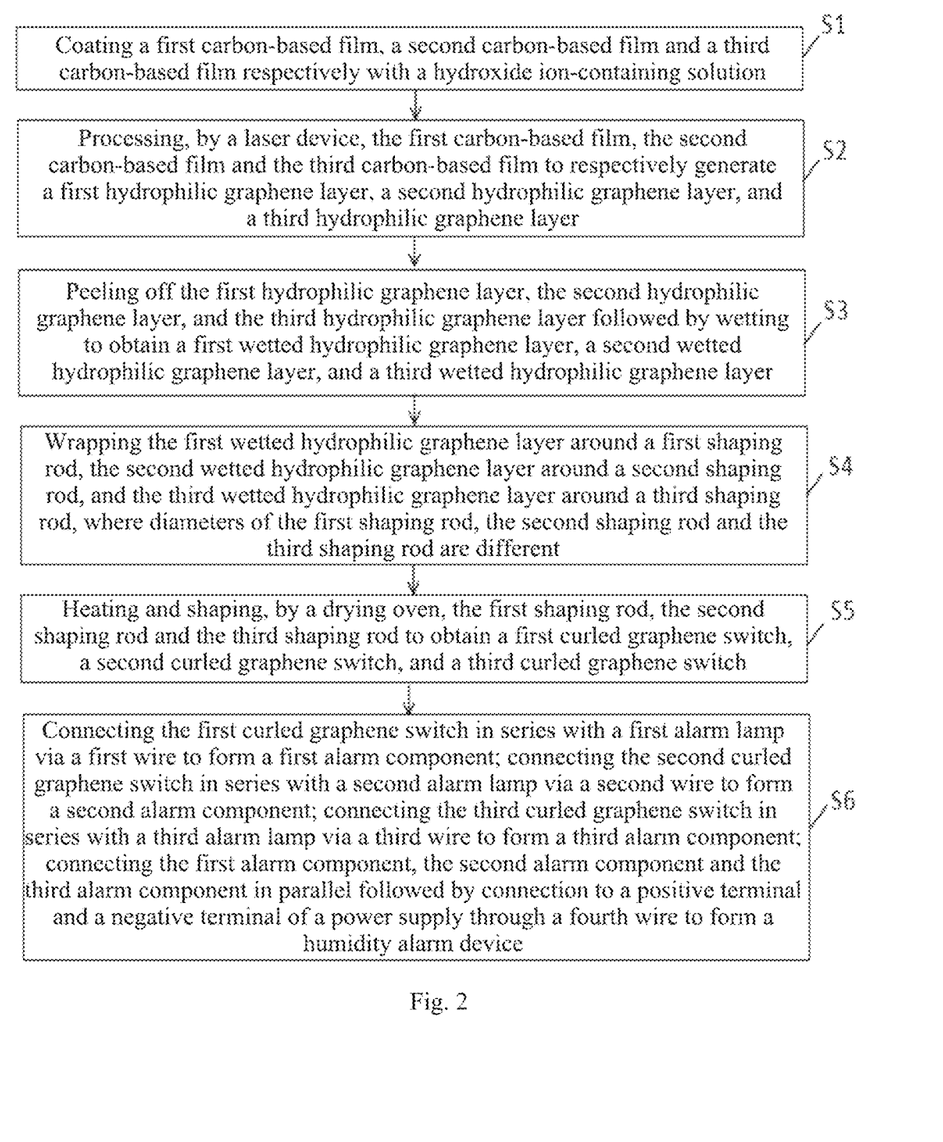
FIG. 2 is a flowchart of a manufacturing process for the humidity alarm device according to an embodiment of the present disclosure.

As shown in FIG. 1, the present disclosure provides a humidity alarm device based on laser-induced graphene, including a first curled graphene switch 11, a first alarm 12, a second curled graphene switch 21, a second alarm 22, a third curled graphene switch 31, a third alarm 32 and a power supply 4. The first curled graphene switch 11 and the first alarm 12 are connected in series via a first wire to form a first alarm component 1. The second curled graphene switch 21 and the second alarm 22 are connected in series via a second wire to form the second alarm component 2. The third curled graphene switch 31 and the third alarm 32 are connected in series via a third wire to form the third alarm component 3. The first alarm component 1, the second alarm component 2, and the third alarm component 3 are connected in parallel and then connected to the positive and negative terminals of the power supply 4 via a fourth wire.

The first alarm component 1, the second alarm component 2, and the third alarm component 3 are connected in parallel, such that distinct alarm signals respectively corresponding to the first alarm component 1, the second alarm component 2 and the third alarm component 3 can be set to distinguish between various humidity alarm levels. The alarm range is customizable, offering broad applicability and strong adaptability. Additionally, due to the use of the hydrophilic graphene switches, the humidity alarm device based on laser-induced graphene exhibits fast response, high precision, low cost, small size, and excellent stability and repeatability.

Specifically, the humidity alarm device further includes a protective shell 5 with a porous structure. The first curled graphene switch 11, the second curled graphene switch 21, and the third curled graphene switch 31 are provided in the protective shell 5. This configuration ensures that the environment around the switches communicates with the outside, maintaining consistent humidity levels.

In this embodiment, the protective shell 5 is a porous plastic shell or a porous ceramic shell, both featuring multiple ventilation holes.

As shown in FIGS. 2-8, the embodiment of the present application provides a method for manufacturing a humidity alarm device based on laser-induced graphene. The method includes the following steps.

Figure 3:
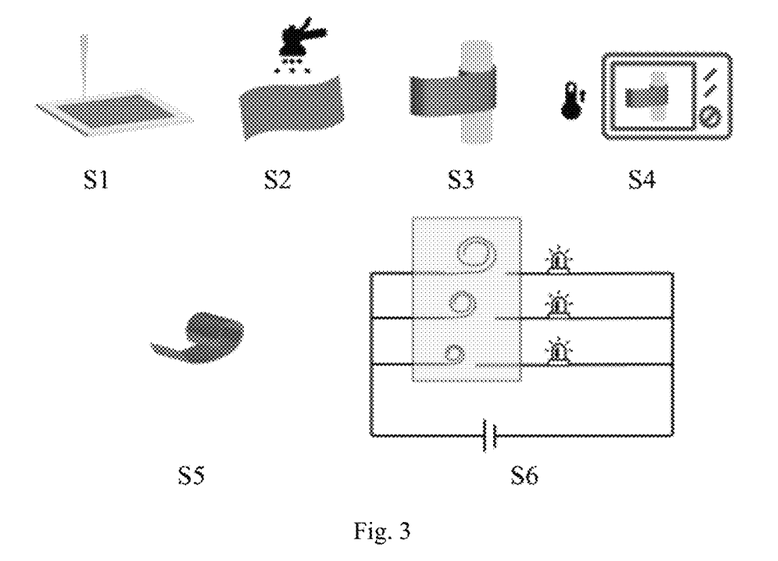
FIG. 3 schematically shows the preparation of the humidity alarm device according to an embodiment of the present disclosure.
Figure 4:
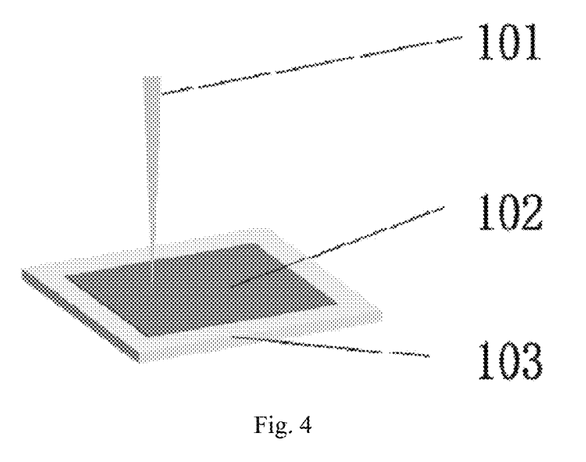
FIG. 4 schematically shows the preparation of a hydrophilic graphene layer using laser device according to an embodiment of the present disclosure.

(S1) Surfaces of a first carbon-based film 103, a second carbon-based film 103 and a third carbon-based film 103 are respectively coated with a hydroxide ion-containing solution 102.

(S2) The first carbon-based film 103, the second carbon-based film 103 and the third carbon-based film 103 are processed by a laser device 101 to respectively generate a first hydrophilic graphene layer, a second hydrophilic graphene layer, and a third hydrophilic graphene layer.

Figure 5:
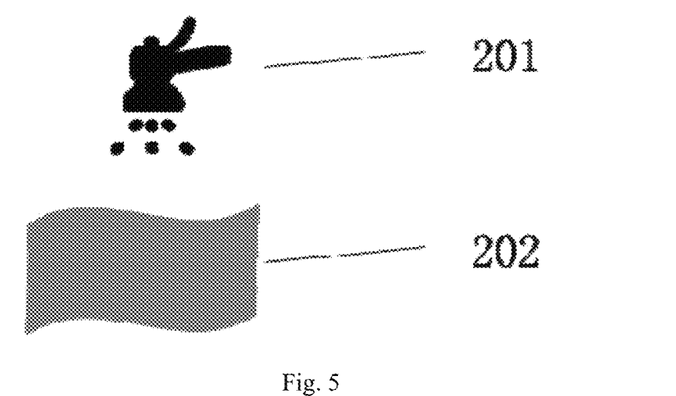
FIG. 5 schematically shows the wetting process of the hydrophilic graphene layer according to an embodiment of the present disclosure.

(S3) The first hydrophilic graphene layer, the second hydrophilic graphene layer, and the third hydrophilic graphene layer are peeled off respectively from the first carbon-based film 103, the second carbon-based film 103 and the third carbon-based film 103 followed by wetting to obtain a first wetted hydrophilic graphene layer, a second wetted hydrophilic graphene layer, and a third wetted hydrophilic graphene layer.

Figure 6:
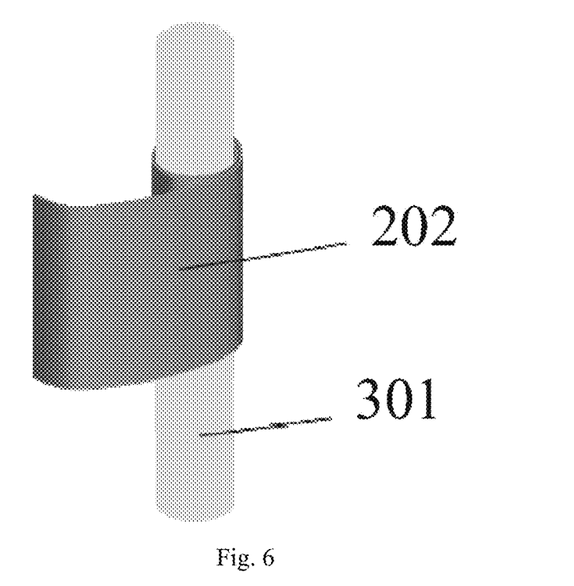
FIG. 6 schematically shows the shaping of the wetted hydrophilic graphene layer into a desired diameter according to an embodiment of the present disclosure.

(S4) The first wetted hydrophilic graphene layer is wrapped around a first shaping rod 302, the second wetted hydrophilic graphene layer is wrapped around a second shaping rod 302, and the third wetted hydrophilic graphene layer is wrapped around a third shaping rod 302 to obtain a first wrapped rod, a second wrapped rod and a third wrapped rod. The first shaping rod 302, the second shaping rod 302 and the third shaping rod 302 vary in diameter.

Figure 7:
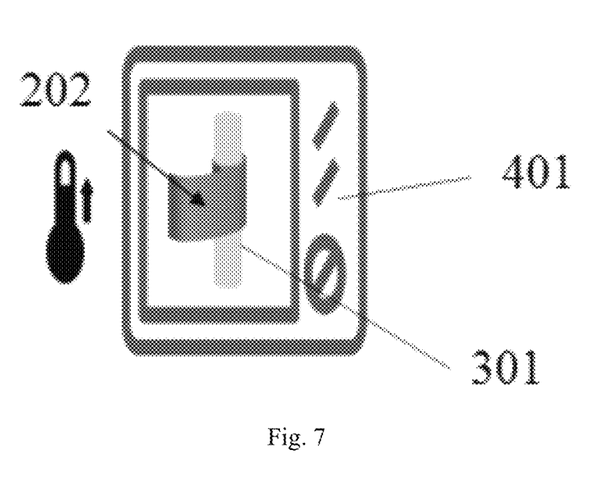
FIG. 7 schematically shows the drying treatment of the hydrophilic graphene layer to form a curled graphene switch according to an embodiment of the present disclosure.

(S5) The first wrapped rod 501, the second wrapped rod 501 and the third wrapped rod 501 are transferred to a drying oven for heating and shaping by a drying oven 401 to obtain a first curled graphene switch 11, a second curled graphene switch 21, and a third curled graphene switch 31, respectively.

Figure 8:
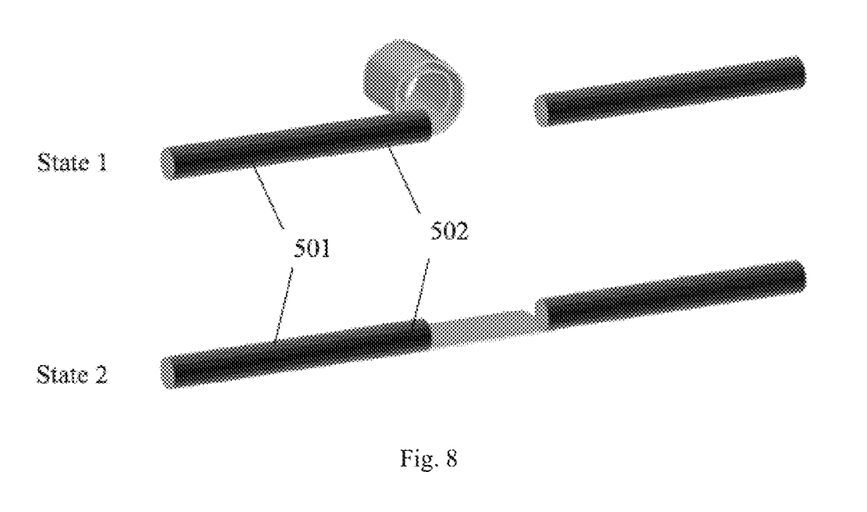
FIG. 8 schematically shows a circuit with the curled graphene switches in different states according to an embodiment of the present disclosure.

(S6) The first curled graphene switch 11 is connected in series with a first alarm lamp 12 via a first wire 501 to form a first alarm component 1; the second curled graphene switch 21 is connected in series with a second alarm lamp 22 via a second wire 501 to form a second alarm component 2; the third curled graphene switch 31 is connected in series with a third alarm lamp 32 via a third wire 501 to form a third alarm component 3; the first alarm component 1, the second alarm component 2 and the third alarm component 3 are connected in parallel and followed by connection to a positive terminal and a negative terminal of a power supply 4 through a fourth wire to form the humidity alarm device.

For clarity, the process for manufacturing the first hydrophilic graphene layer, the second hydrophilic graphene layer, and the third hydrophilic graphene layer are identical. These layers are collectively referred to as hydrophilic graphene layers and are labeled as 202 in the accompanying figures. Additionally, in this embodiment, the curled graphene switch 502 includes the first curled graphene switch 11, the second curled graphene switch 21, and the third curled graphene switch 31.

Furthermore, these carbon-based films 103 are each independently a polyimide film or a polyetherimide film. The hydroxyl ion-containing solution is a sodium hydroxide solution or a potassium hydroxide solution. In the step (S1), the surfaces of the carbon-based films 103 are coated with a potassium hydroxide solution, which is then heated to evaporate the solution and allow potassium hydroxide crystals to form.

Additionally, the laser device 101 is configured to process the three carbon-based films 103 coated with hydroxyl ion-containing solutions to obtain the first hydrophilic graphene layer, the second hydrophilic graphene layer, and the third hydrophilic graphene layer which are rich in carboxyl and hydroxyl groups on their surfaces, making them hydrophilic. These hydrophilic graphene layers are produced with consistent dimensions.

In this embodiment, the shaping rods 501 are smooth cylindrical rods. The diameters of the shaping rod are each independently 1-50 mm. These shaping rods are independently made of a plastic material or a metal material. The laser device 101 is a picosecond ultraviolet laser with a wavelength of 340-360 nm and a power output of 1-5 W.

Notably, the step (S3) includes the following steps. The first hydrophilic graphene layer, the second hydrophilic graphene layer, and third hydrophilic graphene layer are laser-marked by the laser device to in situ multiple times. The first hydrophilic graphene layer is peeled off from the first carbon-based film, the second hydrophilic graphene layer is peeled off from the second carbon-based film and the third hydrophilic graphene layer is peeled off from the third carbon-based film. The first hydrophilic graphene layer, the second hydrophilic graphene layer and the third hydrophilic graphene layer are wetted by spraying to obtain the first wetted hydrophilic graphene layer, the second wetted hydrophilic graphene layer, and the third wetted hydrophilic graphene layer, respectively.

In this embodiment, the diameters of the shaping rods are set based on the humidity requirements of the device. The diameter of the shaping rod corresponds to the curvature diameter that can be flattened at the specified humidity level required by the device. The general rule is that with other variables held constant, larger diameters require lower humidity levels to flatten. Once the diameters of the shaping rod are set, the first wetted hydrophilic graphene layer, the second wetted hydrophilic graphene layer, and the third wetted hydrophilic graphene layer are wrapped around the shaping rods 302 with different diameters.

Additionally, the step (S5) include the following substeps. The first wrapped rod, the second wrapped rod and the third wrapped rod are transferred into a drying oven to be heated and shaped to obtain a first curled graphene switch 11, a second curled graphene switch 21, and a third curled graphene switch 31. After the heating process is complete, the first curled graphene switch 11, the second curled graphene switch 21, and the third curled graphene switch 31 are removed from the first shaping rod, the second shaping rod and the third shaping rod, respectively. Upon completing the above two steps, the fabrication of the first curled graphene switch 11, the second curled graphene switch 21, and the third curled graphene switch 31 is finalized. These switches gradually flatten as humidity increases and return to their original curled state as humidity decreases, enabling stable and repeated usage.

It should be noted that in this present disclosure, the working principle of the curled graphene switch is based on the hydrophilic graphene, which can be considered as a set of single-atom-layered two-dimensional nanosheets that interact and constrain each other while engaging with external water molecules. Therefore, the shape of the hydrophilic graphene film in the curled graphene switch is primarily determined by the stacking arrangement of the hydrophilic graphene nanosheets and the adsorption/desorption of water through quantum-confined superfluid channels.

It should be noted that in this technical solution, the working principle of the curled graphene switch is as follows. The hydrophilic graphene is considered as a set of single-atom-layered two-dimensional nanosheets that interact and constrain each other while engaging with external water molecules. Therefore, the shape of the hydrophilic graphene film in the curled graphene switch is primarily determined by the stacking arrangement of the hydrophilic graphene nanosheets and the adsorption/desorption of water through quantum-confined superfluid channels. For flat hydrophilic graphene films (the original shape), quantum-confined superfluid channels with a spacing of 1 nm naturally form due to the layered stacking structure. The morphology of the hydrophilic graphene film can be defined through four typical steps: wetting, shaping, dehydration, and releasing. Firstly, when the film is wetted, water molecules interact with the oxygen-containing groups of the hydrophilic graphene by forming hydrogen bonds, allowing the hydrophilic graphene film to swell. Then, mechanical force is applied to deform the hydrophilic graphene film, inducing stretching and compression at different positions. Considering the increased interlayer spacing and the lubricating effect of water molecules, the deformation and sliding of individual hydrophilic graphene nanosheets become easier. When the water is removed, desorption occurs, and the mechanical strain at the compressed locations (e.g., the inner side of the bends) causes wrinkles. The removal of external force partially releases the internal stress, forming a temporary shape due to the wrinkling and rearrangement of the hydrophilic graphene nanosheets. Driven by moisture, the temporary shape may revert to its original state during water absorption, as water transport is controlled by the quantum-confined superfluid channels. The hydrophilic graphene film can also be reshaped by repeating the four steps, and each temporary shape can reversibly deform to its original state under moisture drive.

Compared with the prior art, this application at least has the following beneficial effects. The humidity alarm device based on laser-induced graphene provided herein includes a first curled graphene switch, a first alarm, a second curled graphene switch, a second alarm, a third curled graphene switch, a third alarm, and a power supply. The first curled graphene switch and the first alarm are connected in series via a first wire to form the first alarm component. The second curled graphene switch and the second alarm are connected in series via a second wire to form the second alarm component. The third curled graphene switch and the third alarm are connected in series via a third wire to form the third alarm component. The first alarm component, the second alarm component and the third alarm component are connected in parallel and then connected to the positive and negative terminals of the power supply via a fourth wire. Through the parallel connection of the first alarm component, the second alarm component and the third alarm component, distinct alarm signals can be set to distinguish between various humidity alarm levels, so as to achieve the graded alarming. This configuration offers wide application and strong adaptability. Moreover, due to the use of hydrophilic graphene switches, the humidity alarm device exhibits fast response, high precision, low cost, small size, good stability, and excellent reproducibility. Additionally, the preparation method for this device is simple and easy to operate.

Described above are merely preferred embodiments of this application, and are not intended to limit this application. It should be understood by those skilled in the art that any modifications, equivalent substitutions, and improvements made without departing from the spirit of this application shall fall in the scope of this application defined by the appended claims.

What is claimed is:

1. A method for manufacturing a humidity alarm device based on laser-induced graphene, comprising:
   (S1) coating surfaces of a first carbon-based film, a second carbon-based film and a third carbon-based film respectively with a hydroxide ion-containing solution;
   (S2) processing, by a laser device, the first carbon-based film, the second carbon-based film and the third carbon-based film to respectively generate a first hydrophilic graphene layer, a second hydrophilic graphene layer, and a third hydrophilic graphene layer;
   (S3) peeling off the first hydrophilic graphene layer, the second hydrophilic graphene layer, and the third hydrophilic graphene layer respectively from the first carbon-based film, the second carbon-based film and the third carbon-based film followed by wetting to obtain a first wetted hydrophilic graphene layer, a second wetted hydrophilic graphene layer and a third wetted hydrophilic graphene layer;
   wherein the step (S3) comprises:
      laser-marking, by the laser device, the first hydrophilic graphene layer, the second hydrophilic graphene layer and the third hydrophilic graphene layer in situ multiple times;
      peeling off the first hydrophilic graphene layer from the first carbon-based film, the second hydrophilic graphene layer from the second carbon-based film and the third hydrophilic graphene layer from the third carbon-based film; and
      wetting the first hydrophilic graphene layer, the second hydrophilic graphene layer and the third hydrophilic graphene layer by spraying to obtain the first wetted hydrophilic graphene layer, the second wetted hydrophilic graphene layer and the third wetted hydrophilic graphene layer, respectively;
   (S4) wrapping the first wetted hydrophilic graphene layer around a first shaping rod, the second wetted hydrophilic graphene layer around a second shaping rod and the third wetted hydrophilic graphene layer around a third shaping rod, wherein the first shaping rod, the second shaping rod and the third shaping rod vary in diameter;
   (S5) transferring the first shaping rod wrapped with the first wetted hydrophilic graphene layer, the second shaping rod wrapped with the second wetted hydrophilic graphene layer and the third shaping rod wrapped with the third wetted hydrophilic graphene layer to a drying oven for heating and shaping to obtain a first curled graphene switch, a second curled graphene switch, and a third curled graphene switch, respectively; and
   (S6) connecting the first curled graphene switch in series with a first alarm lamp via a first wire to form a first alarm component; connecting the second curled graphene switch in series with a second alarm lamp via a second wire to form a second alarm component; connecting the third curled graphene switch in series with a third alarm lamp via a third wire to form a third alarm component; and connecting the first alarm component, the second alarm component and the third alarm component in parallel followed by connection to a positive terminal and a negative terminal of a power supply through a fourth wire to form the humidity alarm device.

2. The method of claim 1, wherein the first carbon-based film, the second carbon-based film and the third carbon-based film are each independently a polyimide film or a polyetherimide film.

3. The method of claim 1, wherein the hydroxide ion-containing solution is a sodium hydroxide solution or a potassium hydroxide solution.

4. The method of claim 1, wherein the first shaping rod, the second shaping rod and the third shaping rod are each a cylinder with a smooth surface; diameters of the first shaping rod, the second shaping rod and the third shaping rod are independently 1-50 mm; and the first shaping rod, the second shaping rod and the third shaping rod are each independently made of a plastic material or a metal material.

5. The method of claim 1, wherein the laser device is a picosecond ultraviolet laser with a laser wavelength of 340-360 nm and a laser power of 1-5 W.

\* \* \* \* \*